(12) United States Patent
Hsu (10) Patent No.: US 7,422,921 B2
(45) Date of Patent: Sep. 9, 2008

(54) MICROMESH MATERIAL AND MICROMESH MONO-CRYSTAL HIGH FREQUENCY CAPACITOR AND ITS PRODUCING METHOD

(75) Inventor: Chavy Hsu, Yang-Mei Town (TW)

(73) Assignee: ABC Taiwan Electronics Corp., Tao-Yuan County (TW)

( * ) Notice: Subject to any disclaimer, the term of this patent is extended or adjusted under 35 U.S.C. 154(b) by 43 days.

(21) Appl. No.: 10/304,737

(22) Filed: Nov. 27, 2002

(65) Prior Publication Data

US 2004/0100753 A1    May 27, 2004

(51) Int. Cl.
*H01L 21/00* (2006.01)
(52) U.S. Cl. .............................. 438/63; 438/250; 438/89
(58) Field of Classification Search ............... 438/253, 438/780, 800, 981, 960, 54, 63, 89, 250, 438/961
See application file for complete search history.

(56) References Cited

U.S. PATENT DOCUMENTS 6,753,277 B2 *   6/2004   Terashi .................... 501/32

* cited by examiner

*Primary Examiner*—David Vu
*Assistant Examiner*—Thinh T Nguyen
(74) *Attorney, Agent, or Firm*—Alan Kamrath; Kamrath & Associates PA (57) ABSTRACT

This invention is related to a micromesh material and a mono-crystal high frequency capacitor manufactured with said micromesh material as well as the producing method for the mono-crystal high frequency capacitor, i.e., disperse a colloidal material unevenly to form a sub-micrometer ceramic cell structure to get a micromesh mono-crystal material on the basis of the theory of liquid-liquid phase transformation, and produce capacitors with the obtained material to enhance the high frequency characteristics of those capacitors with the micromesh mono-crystal structure (air medium) of dielectric ceramics.

4 Claims, 7 Drawing Sheets

Diagram of Milling Duration vs. Particle Diameter

| Time (hr). | Diameter (um) | Viscosity (cp) 12rpm | BYK-111 |
|---|---|---|---|
| 5 | 0.491 | 53.5 | 1.2% |
| 7.5 | 0.189 | 26.6 | 1.2% |
| 10 | 0.132 | 10 | 2.0% |
| 12.5 | 0.125 | 8.6 | 2.0% |

Particle Size Analysis : HORIBA LA-920

Fig 5

| Temp °C | 1060 | 1040 | 1020 |
|---|---|---|---|
| K | 62.48 | 61.15 | 56.47 |
| Cell Ratio % | 10.1 | 15.2 | 22.3 |

Fig 6

| NPO temperature characteristic | | | |
|---|---|---|---|
| Size (in) | 1008 | 0805 | 0603 |
| Cap. (pF) | 1.0~4.5 | 0.7~1.5 | 0.25~0.65 |
| SRF. (GHz) | More then 3 GHz | | |
| X7R temperature characteristic | | | |
| Size (in) | 1008 | 0805 | 0603 |
| Cap. (pF) | 10~35 | 5~25 | 3~10 |
| SRF (GHz) | 1.8 | 2.4 | 3 over |
| Other temperature characteristic | | | |
| Size (in) | 1008 | 0805 | 0603 |
| Cap. (pF) | 1.0~6.0 | 0.8~2.0 | 0.5~1.2 |
| SRF (GHz) | More then 3 GHz | | |

| For 0603 size chip capacitors | | | |
|---|---|---|---|
| Temperature characteristics | X7R | NPO | Other |
| Capacitance pF | 3~10 | 0.25~0.65 | 0.5~1.2 |
| Frequency GHz | 3 | More then 3 | More then 3 |
| Voltage Withstanding KV | 5 over | 5 over | 5 over |

Conditions for Capacitance Test: 1.0 volt 1MHz for HP 4194A LCR meter

Frequency Test: HP 8753E network analyzer

Voltage Withstanding Test: TOS WITHSTANDING VOLTAGE TESTER

Fig 7

1008 size NPO 3.2 pF

Fig 7-1

1008 size other 1.31pF

Fig 7-2

1008 size X7R 12.1 pF

0603 size other 0.60 pF

Fig 7-6

0603 size X7R 10.69 pF

Fig 7-7

MICROMESH MATERIAL AND MICROMESH MONO-CRYSTAL HIGH FREQUENCY CAPACITOR AND ITS PRODUCING METHOD

DESCRIPTION OF THE INVENTION

This invention is related to a micromesh material and mono-crystal high frequency capacitors made of said material and the producing method for said capacitors. With the method described in this invention, high value-added products can be produced through simple processes, and the high frequency characteristics of capacitors made of said material can be improved significantly.

Ceramic capacitors belong to a type of capacitors, and they are reactive components. A ceramic capacitor is produced through coating a metal film on each side of a round ceramic plate (dielectric medium). Ceramic capacitors can be classified into low dielectric medium constant ones, high dielectric medium constant ones, and semiconductor ones by the type of ceramics used. Low dielectric medium constant ceramic capacitors utilize titanium oxide family as the dielectric medium; high dielectric medium constant ceramic capacitors utilize barium titanate family as the dielectric medium; while semiconductor ceramic capacitors utilize barium titanate added with impurities as the dielectric medium. Ceramic capacitors can also be classified into single-layer ceramic capacitors (SLCC) and multi-layer ceramic capacitors (MLCC). Ceramic capacitors are featured with high dielectric coefficient, high insulation capacity, and excellent temperature behaviors. They can be manufactured into small size products that ideal for portable phones and notebook PCs. The capacitance of a MLCC is proportional to the surface area and the number of ceramic layers of the MLCC.

In recent years, with the quick evolution of ceramic film stacking technology, the capacitance of ceramic capacitors increases very fast, and ceramic capacitors increasingly substitute legacy capacitors with low medium capacitance (such as electrolytic capacitors and tantalum capacitors). In addition, MLCCs can be produced with SMT (surface mount technology), thus the productivity for them is more efficient than that for electrolytic capacitors or tantalum capacitors. Therefore, ceramic capacitors are receiving more and more attention in the market and developing very fast. However, the main raw material of MLCCs is palladium, which is mainly produced in Russia and its price is directly influenced by the situation in Russia. Because that more layers in MLCCs require more palladium, which is highly expensive, high cost becomes an obstacle to the mass production of MLCCs.

Recently, portable communication terminals and consumer electronic products become more and more powerful in their functionalities, which mean increased circuit density and high frequency to enhance the processing capacity of ICs. Currently, most high frequency capacitors available in the market are 0402 or 0201 products, which are very small. However, most domestic MLCC manufacturers are unable to produce small capacitors, and relevant elements and components have to be imported from overseas. With the fast development of technologies, acquirement of materials for high-tech products becomes a hard nut to crack. Furthermore, ceramic materials have common shortcomings: low toughness, low strength, and compromised reliability. In 1986, Niihara, a professor of Osaka University, Japan, introduced a concept of nanometer compound material, i.e., disperse sub-micrometer particles in a base material (ceramic material) evenly to significantly enhance the base material with the improvement of microstructures to endow the base material with unique mechanic characteristics as well as enhance to reliability of the ceramic material. Nanometer compound ceramic materials are featured with even distribution of micro particles. However, those micro particles are easily to conglomerate under the Franderwa Force and other forces and then difficult to disperse, resulting in overgrowth of crystal grains. Thus, in its crucial moment to select a ceramic base material that can be combined with the second compound as well as appropriate conditions that can facilitate dispersing the micro particles in preparation of the compound colloid.

An alumina dispersed solution with Semicarbazide as the dispersing phase was found. Alumina has been taking an important role in producing delicate ceramics, especially for circuit back plates in the electronic industry. And most high strength wear-resistant products evolve towards high purity alumina (>99%). The producing methods for such delicate ceramic products mainly comprise: mold ceramic flans with sinter-able high purity alumina powder, and then sinter the flans into ceramic products. Recent researches indicated that the colloidal processing method is an effective approach to enhance the toughness of alumina ceramic products, and complicated ceramic flans can be produced through slip casting or pressure casting. For example, ceramic flans can be molded with evenly distributed and non-agglomerated sub-micrometer alumina powder, and then ceramic products with evenly distributed and micromesh crystal grains of several-micrometer sizes. Such ceramic products have significantly enhanced mechanic strength. Commonly used dispersing phases may be classified into two types: one makes alumina particles carry electronic charges on their surfaces in the solution to form Coulomb repulsion; the other utilizes steric hindrance resulted from adhesion effect of macromolecules to implement dispersing efficacy. When high surface area ratio alumina particles are added into a strong acidic solution or strong alkaline solution, the solution will change into a weak acidic solution or weak alkaline solution. However, in a neutral solution, hydrogen bond bridging effect will form on surfaces of sub-micrometer alumina particles. Hence the solution will form a gel, and a large amount of bubbles can not emerge out of the surface of the gel due to high viscosity of the gel. Therefore, the most common dispersing method is to tune the PH value of ceramic gels, such as the method in China Patent No. 79100101 (Announcement No: 147864). However, that method is not suitable for high surface area ratio alumina particles. When a macromolecular material serves as the dispersing phase, the mechanisms for adhesion and decomposition of the macromolecules on alumina particles and increase of gel viscosity are very complicated, especially for macromolecular phases with heavy molecular weights. Therefore, macromolecular phases may have complex influence to the ceramic products.

As described above, most legacy ceramic capacitor materials are required to have highly dense piling structures among particles after they are sintered, in order to enhance the electric characteristics of those capacitors. Moreover, the silver/palladium materials among layers in MLCCs usually occupy 30% of the total costs of MLCCs. Most manufacturers are tolerant to high cost but low price capacitors. However, it is an exciting task that whether micromesh ceramic materials can be molded directly and high frequency characteristics of ceramic capacitors can be improved with the help of air medium (in micromesh mono-crystal structures) to produce highly value-added products through simplified production procedures.

The main purpose of this invention is to provide a method for producing micromesh materials, comprising: mixing a dielectric ceramic material with two organic solvents (EtOH (ethyl alcohol) and Toluene) and a dispersing phase proportionally, grinding the mixture into micro-level powder with grinding balls of different diameters, agitating vehemently the micro-level powder and an agglomerant mixed with PVA (polyvinyl alcohol) and water in proportion till they form a gel, and finally baking the gel into a solid, i.e., a micromesh material.

Another purpose of this invention is to provide a method for producing micromesh mono-crystal high frequency capacitors, comprising: milling above micromesh material into powder, molding the powder into expected shapes, sintering the molded material, cutting off burrs, and coating electrodes to form micromesh mono-crystal high frequency capacitors.

Also, another purpose of this invention is to provide a micromesh mono-crystal high frequency capacitor, which comprises dielectric ceramics layers and at least two electrodes; wherein said capacitor is featured with: said dielectric ceramics layers has a micromesh structure (hollow crystalline). With the micromesh mono-crystal structure of said dielectric ceramics layers and air medium, the high frequency characteristics of the capacitor can be significantly enhanced.

Figure 1:
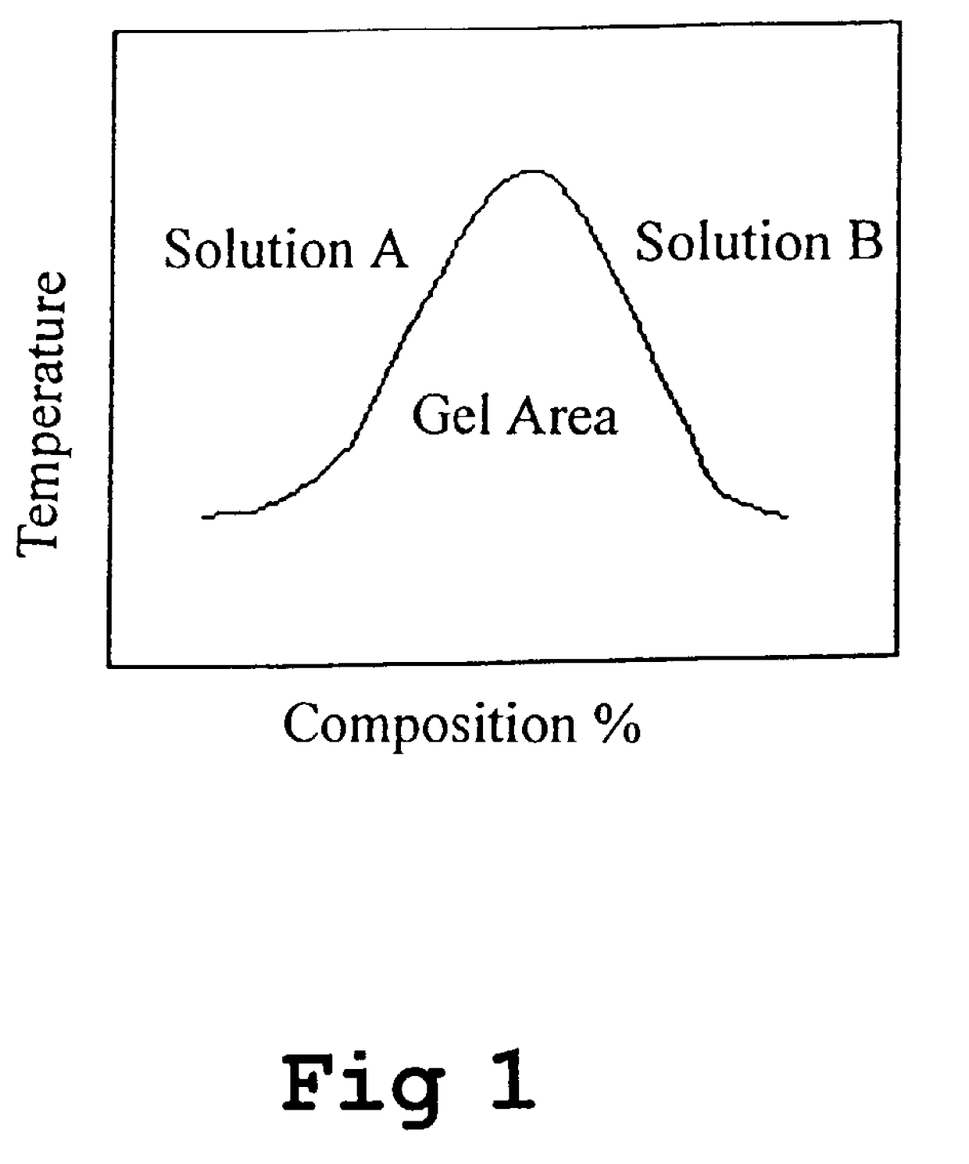
FIG. 1 is a view of liquid-liquid phase transformation described in this invention.

The theory utilized in this invention is further detailed as follows:

1. Micro-Chemical Part:
   Liquid-Liquid Phase Transformation:
   This invention utilizes two organic solvents (Toluene and EtOH) and a hydrophilic macromolecular agglomerant to form a mixture, wherein the EtOH (ethyl alcohol) will be dissolved completely in water; while the Toluene molecules will repel the hydrophilic functional base. Then the mixture can be agitated into a gel (see the gel area in FIG. 1) utilizing the in-dissolvableness between the Toluene and the hydrophilic functional base. And then the ceramic powder will be added into the gel, as shown in FIG. 2. At this time, large particles in the gel will conglomerate at once under the Franderwa Force to form masses; while small particles will attach to the masses. And the macromolecules will form stable covalent bonds with the molecules of the inorganic material. (FIG. 2 is a simulation view of particle dispersion; wherein FIG. 2-1 illustrates even dispersion; while FIG. 2-2 illustrates uneven dispersion in the gel). In that way, natural and evenly distributed cells will occur in the ceramic material after the ceramic material is sintered, resulting in a micromesh mono-crystal structure.

2. Physic Part
   In order to form above structure among powders, ceramic particles of different diameters shall be used to mix together, wherein small particles may be sub-micrometer-level ones (e.g., 0.13 μm). If particles of smaller diameters are used, some compositions will be lost in the sintering process, which will result in side effects to the electric characteristics of the finished products. At the same time, in consideration of other characteristics of ceramic material, the heating conditions shall be paid attention in the sintering process in order to obtain better result.

The method for producing the micromesh material in this invention comprises the following procedures:

Mixture preparation: mix evenly a dielectric ceramics with EtOH and Toluene and a dispersing phase (the viscosity shall be controlled under 10 cp whenever possible) in proportion, and mill the mixture into sub-micro powder with grinding balls (e.g., zirconia or alumina balls);

Agglomerant preparation: mix PVA (polyvinyl alcohol) and water in proportion and agitate the solution;

Agglomerant addition: mix above sub-micrometer powder with above agglomerant and agitate vehemently to form a gel;

Baking: bake above gel into solid, i.e., a micromesh material.

In milling with the grinding balls, grinding balls of different sizes can be used and the process shall be carried out at a low speed. In this way, the milling duration can be significantly reduced.

In addition, with above micromesh material, a micromesh mono-crystal high frequency capacitor can be produced. The procedures are as follows:

1. Particles preparation: mill above micromesh material into particles in a mortar, and then press the particles into flans in a special device;
2. Sintering: sinter above flans of micromesh material into matters with natural and even cells (i.e., a micromesh mono-crystal structure), cut off the burrs, and coat electrodes to form micromesh mono-crystal high frequency capacitors.

In consideration of other characteristics of electronic ceramic materials, a three-phase heating process will be used in above sintering to achieve better results.

The micromesh mono-crystal high frequency capacitor in this invention can be produced with a legacy method for producing electrodes. A legacy method for producing electrodes typically comprises silver plating, nickel plating, and tin plating. However, electroplating is not suitable for micromesh structures because electroplate solution may remain in the cells. For micromesh structures, vacuum sputtering is recommended, for it has the following benefits:

1. Low cost on equipment;

2. Direct coating;

3. Higher mechanic strength;

4. high precision

Figure 3:
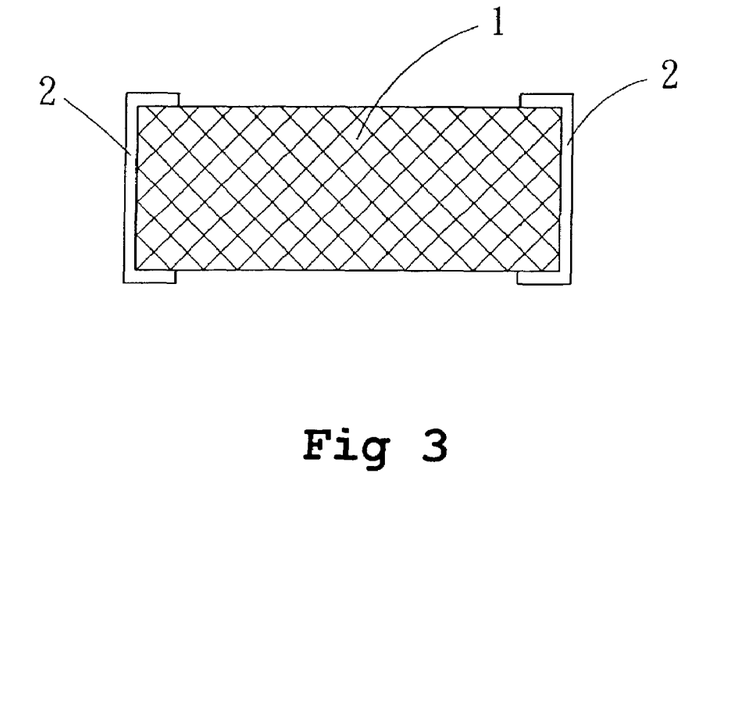
FIG. 3 is a sectional view of the micromesh mono-crystal high frequency capacitor in this invention.

The micromesh mono-crystal high frequency capacitor produced with the method described in this invention comprises dielectric ceramics layers 1 and at least 2 electrodes 2, wherein the dielectric ceramics layers 1 have a hollow cell (micromesh) structure. With the micromesh structure and air medium, the high frequency of that capacitor can be significantly enhanced.

The SRF (self-resonant frequency) ceramic capacitors produced with the method described in this invention completely overcome the shortcomings of high cost and unreliability of MLCCs. In addition, some capacitors that have higher high frequency electric characteristics than MLCCs or round plate ceramic capacitors through simplified production procedures. The application scope of such capacitors covers: communication (portable phones, automobile phones, and wireless transmission products, etc.) and IT (PDAs, NBs, and high frequency and high current digital ICs). It is expected that more ceramic capacitors can be made of micromesh materials in the future.

Hereunder a preferred embodiment of this invention is discussed to further verify this invention:

Mixture preparation: Dielectric ceramics: 137.87 g, EtOH: 25.06 g, Toluene: 37.06 g, dispersing phase (e.g., BYK-111): 2.76 g (2.0 of the weight of above dielectric ceramics, the viscosity is controlled under 10 cp in order to ensure evenly dispersion), mill the mixture for 12 hours into powder (D=0.10~0.14 μm) with zirconia balls (Φ=3 mm:10 mm:30 mm=5:3:2). (The milling duration may be significantly reduced with above zirconia balls of 3 different sizes.)

Figure 4:
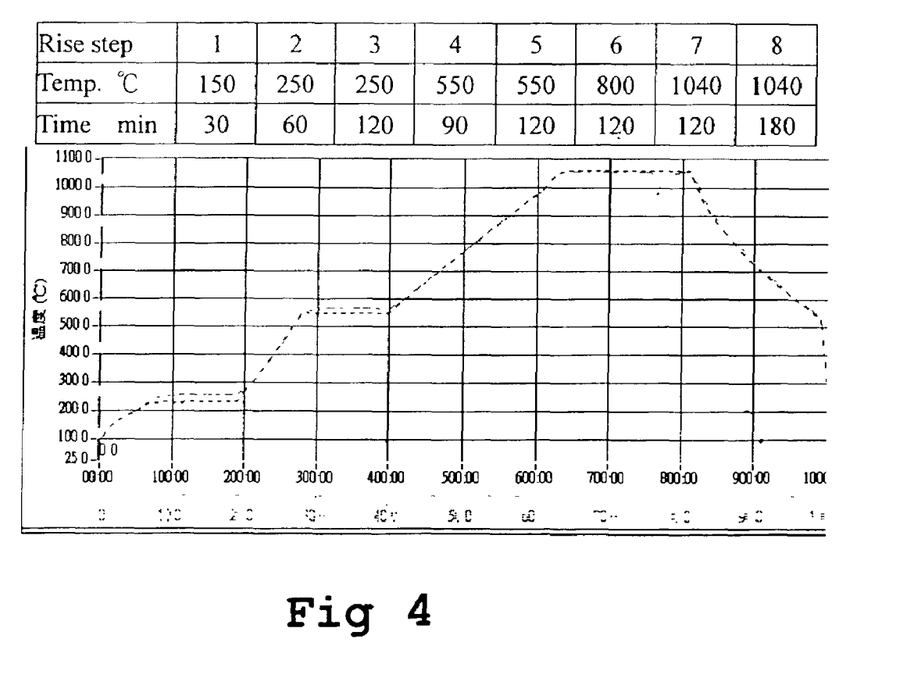
FIG. 4 is a view of heating configuration in this invention.

Agglomerant preparation: add PVA (0.4 g) into water (9.6 g) and agitate to evenly (PVA=4%);

Mix above powder (5 g, D=0.13 μm) with above agglomerant (5 g, 4% PVA) and agitate vehemently to form gel, and then bake the gel into solid;

Particle preparation: mill above solid into powder into powder in a mortar, and press the powder (0.5 g) into a flan in a special device;

Sintering: heat the plan to in 3 phases (see FIG. 4);

Cut off burrs, coat silver, and measure the electric characteristics of the finished product. Thus a micromesh mono-crystal high frequency capacitor is produced.

Figure 5:
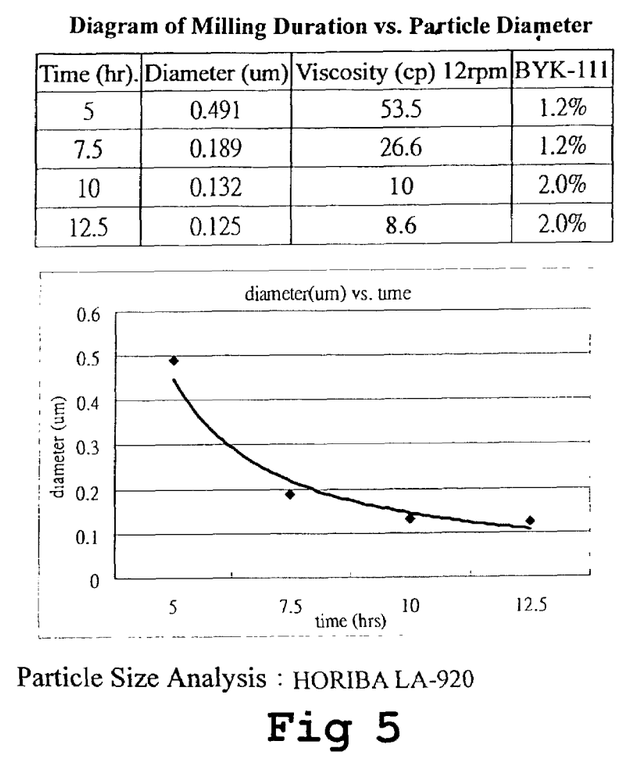
FIG. 5 is a diagram of milling duration (T) vs. particle diameter (D)
Figure 6:
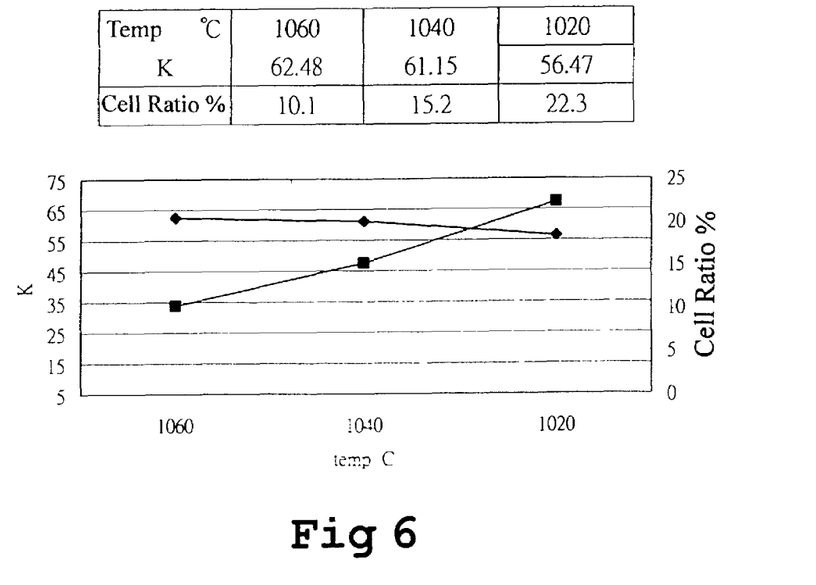
FIG. 6 is a diagram of sintering temperature (T) vs. dielectric constant (C) and cell ratio (R)
Figure 7:
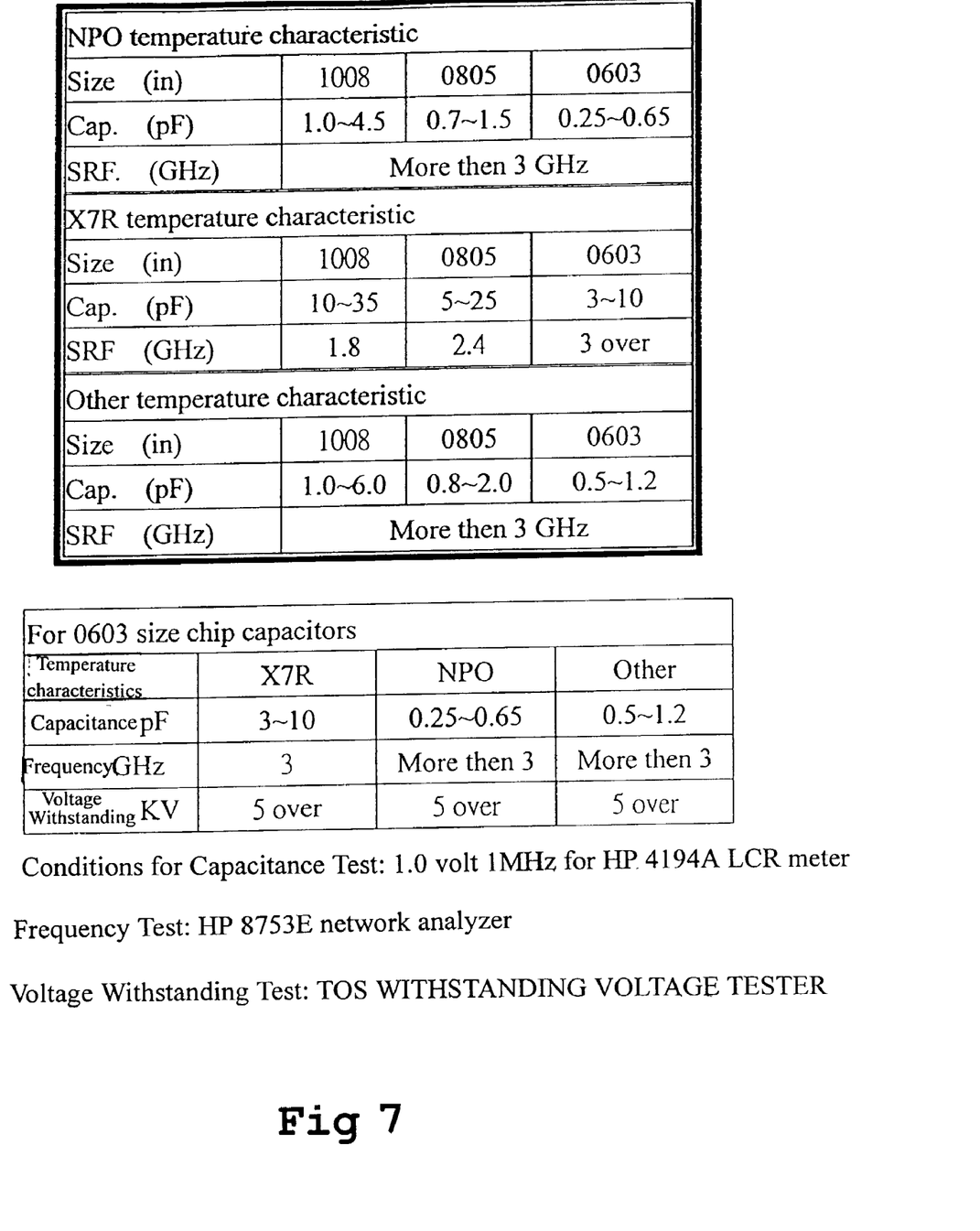
FIG. 7 is a diagram of the frequency characteristics of the finished capacitor.
Figure 21:
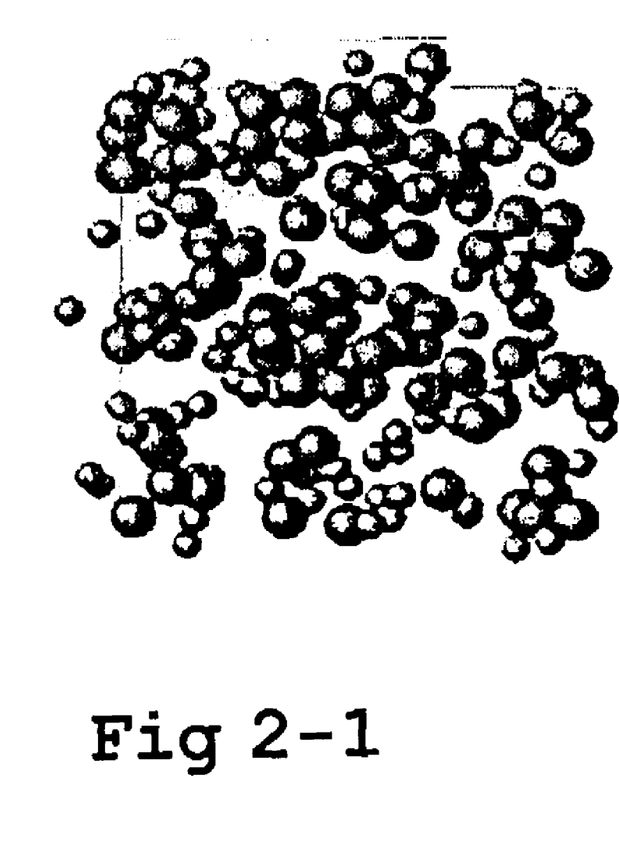
Figure 22:
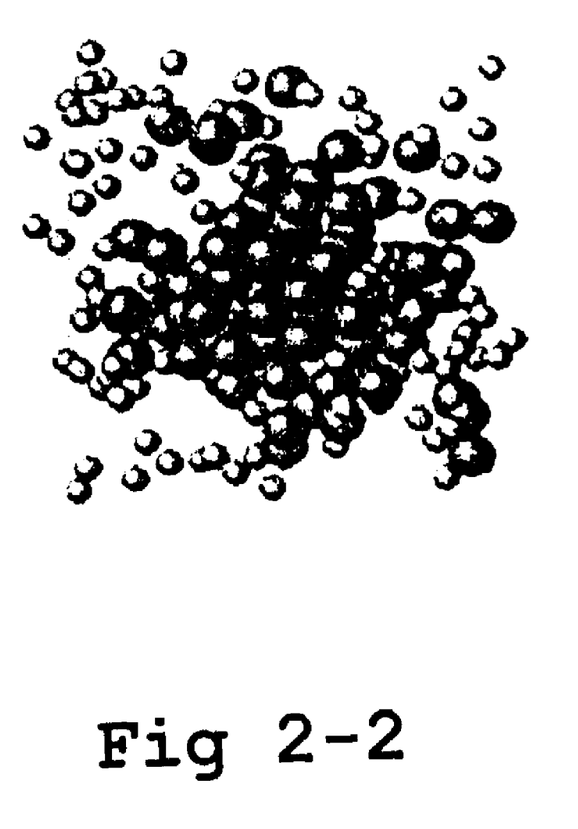
Figure 71:
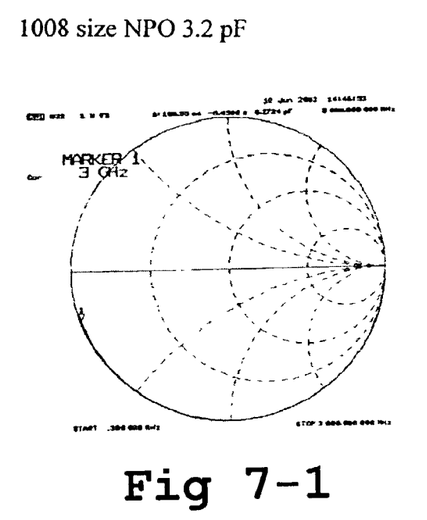
Figure 72:
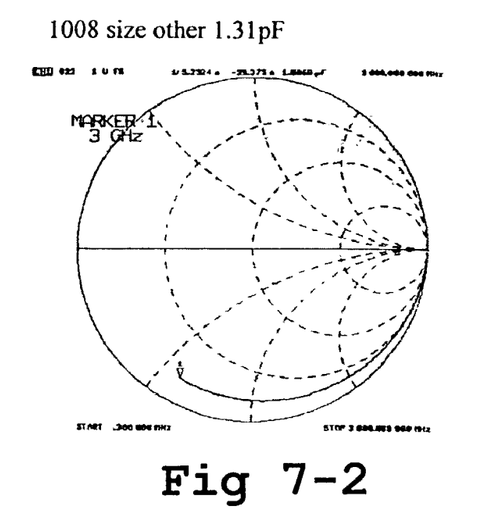
Figure 73:
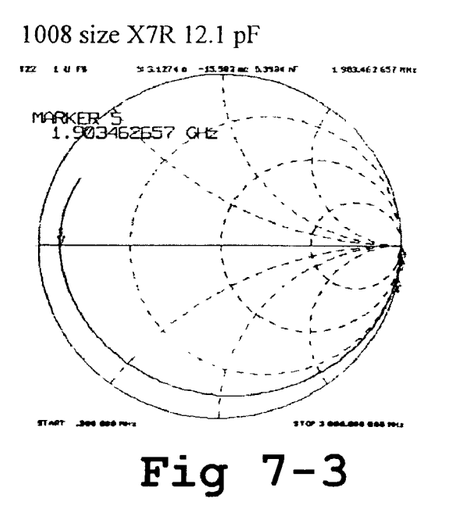
Figure 74:
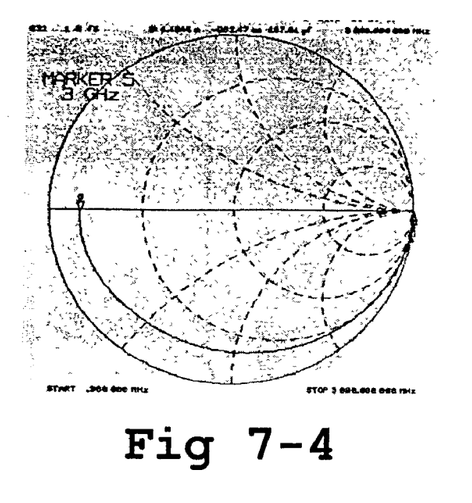
Figure 75:
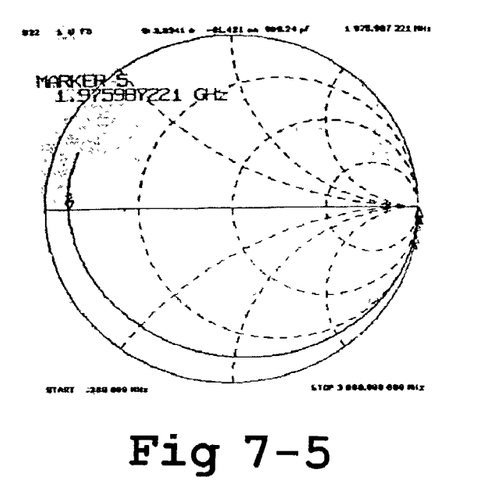
Figure 76:
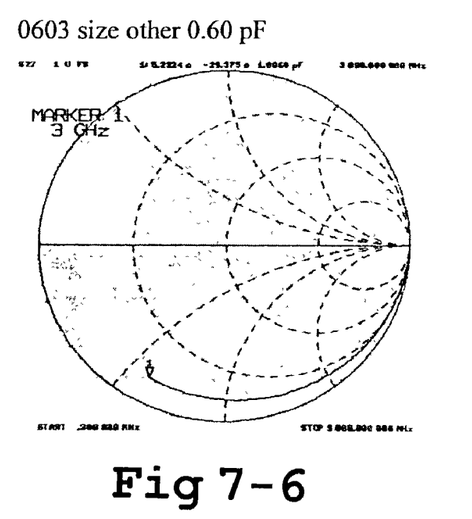
Figure 77:
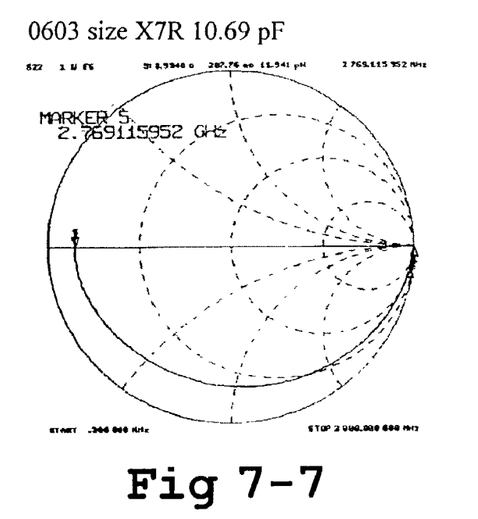

Please see the following diagrams for the result of above embodiment:

FIG. 5 is a diagram of milling duration (T) vs. particle diameter (D);

FIG. 6 is a diagram of sintering temperature (T) vs. dielectric constant (C) and cell ratio (R) (In case the cell ratio exceeds 18%, the mechanic strength of the finished product will be not insufficient and the voltage withstanding capacity of the capacitor will be very low);

FIG. 7 is a diagram of the frequency characteristics of the finished capacitor:

Conditions for Capacitance Test: 1.0V, 1 MHz for HP 4194A LCR Meter;

Frequency Test: HP 8753E network analyzer;

Voltage Withstanding Test: TOS WITHSTANDING VOLTAGE TESTER

Wherein, the capacitors in the following figures: FIG. 7-1: 1008 size NPO 3.2 pF; FIG. 7-2: 1008 size other 1.31 pF; FIG. 7-3: 1008 size X7R 12.1 pF; FIG. 7-4: 0805 size other 1.10 pF; FIG. 7-5: 0805 size X&R 9.5 pF; FIG. 7-6: 0603 size other 0.60 pF; FIG. 7-7: 0603 size X7R 10.69 pF.

In conclusion, the micromesh material and the micromesh mono-crystal high frequency capacitor and the producing method for the capacitor are innovative ones, and this invention can really overcome shortcomings in legacy technologies. Thus the inventor applies for a new patent with it.

Above description are only for a preferred embodiment of this invention and shall not constitute any limitation to the application scope of this invention. Any implementation with equivalent modifications or embellishment to this invention shall fall into the concept of this invention.

DESCRIPTION OF THE DRAWINGS

FIG. 2 is a simulated view of particles dispersion in this invention;

DESCRIPTION OF SYMBOLS

1. Dielectric Ceramics Layer
2. Electrode

What is claimed is:

1. A method for producing a micromesh material, comprising: mixing a dielectric ceramic material with two organic solvents (EtOH (ethyl alcohol) and Toluene) and a dispersing phase proportionally, grinding the mixture into micro-level powder with grinding balls, agitating vehemently the micro-level powder and an agglomerant mixed with PVA (polyvinyl alcohol) and water in proportion till they form a gel, and finally baking the gel into a micromesh material.

2. The method for producing a micromesh material according to claim 1, wherein said grinding balls are of different diameters and said milling process is carried out at a relatively low speed to reduce the milling duration significantly.

3. A method for producing micromesh mono-crystal high frequency capacitors, comprising: milling above micromesh material into powder, molding the powder into expected shapes, sintering the molded material, cutting off burrs, and coating electrodes to form micromesh mono-crystal high frequency capacitors.

4. The method for producing micromesh mono-crystal high frequency capacitors according to claim 3, wherein heating in said sintering process is a 3-phase one.

* * * * *